H. R. EWERT.
PIPE COUPLING DEVICE.
APPLICATION FILED JAN. 2, 1912.

1,065,515.

Patented June 24, 1913.

Herman R. Ewert, Inventor

Witnesses
Lester L. Sargent.
John Aukward

By Jerry A. Mathews
Attorney

UNITED STATES PATENT OFFICE.

HERMAN R. EWERT, OF SPOONER, WISCONSIN.

PIPE-COUPLING DEVICE.

1,065,515.  Specification of Letters Patent.  Patented June 24, 1913.

Application filed January 2, 1912. Serial No. 668,951.

*To all whom it may concern:*

Be it known that I, HERMAN R. EWERT, a citizen of the United States, residing at Spooner, in the county of Washburn and State of Wisconsin, have invented certain new and useful Improvements in Pipe-Coupling Devices, of which the following is a specification, reference being had to the accompanying drawings, forming a part hereof.

My invention relates to certain improvements in pipe coupling devices in which two counterpart coupling sections are held in connection in train-pipe and similar couplings, and particularly to the combination of my improved gaskets and pipe coupling sections to maintain a tight joint between the coupled sections of a pipe coupling under all conditions.

The object of my invention is to combine advantageously an improved gasket with a pipe coupling of standard type but having an improved construction of the wall of the coupling, to make a more effective pipe coupling, and to provide a gasket so constructed as to be reversible, thereby increasing its usefulness.

A further object of my invention is to devise a gasket which can be held more securely in my improved pipe coupling to lessen the possibility of leakage and when two sections are coupled to secure a tightly-abutting joint the firmness of which will not be impaired by cold; and to accomplish this in a novel manner, first, by providing a gasket which may be securely positioned within the radial opening of the pipe coupling section and having an abutting surface of increased extent; and, second, by improving the manner in which the joint between opposing sections of the coupling is maintained.

One of the objects of the invention is to pinch abutting gasket flanges between annular flanges positioned within the fluid openings of opposing coupling sections.

Figure 1:
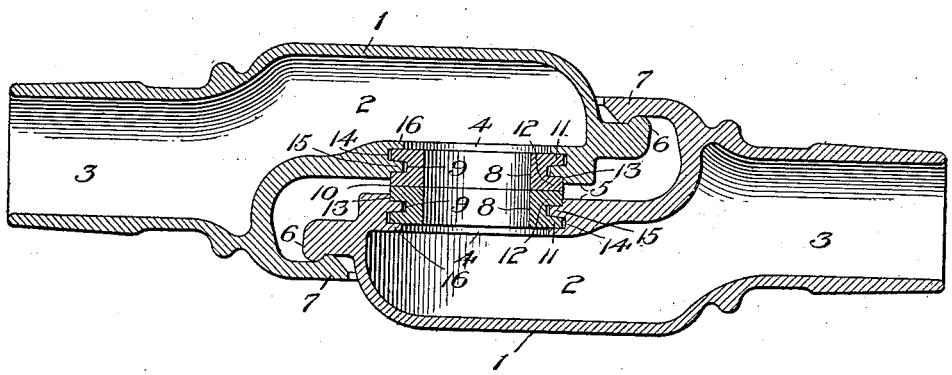
Figure 2:
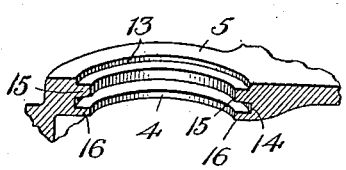
Figure 3:
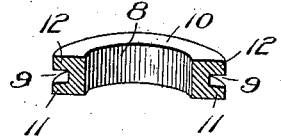

In the accompanying drawings: Figure 1 is a longitudinal section of my improved pipe coupling; Fig. 2 is a detail sectional and perspective view of the wall of the fluid opening of a pipe coupling section; Fig. 3 is a sectional and perspective view of the gasket.

Like characters of reference indicate the same parts in all the views.

My pipe coupling consists of two hollow coupling sections which are counterparts of each other. Each coupling section consists of a chambered section 1, having a lateral fluid opening 4 leading into the chamber 2 of the coupling section, and a tubular extension 3, for attaching the coupling member to hose. Each coupling section is provided with a curved flange 6 and a grooved projection 7, on opposite sides of the lateral fluid opening 4 in the face 5 of the coupling section. The sections are coupled by a rotary movement of each coupling section on the axis of the fluid opening until the grooved projection of one coupling section comes in contact with the stop (not illustrated) of the opposing coupling section, so as to lock the flange of one coupling section with the grooved projection of the opposing coupling section in the usual manner. In these features my coupling conforms to what is old in the art.

My invention resides in the details of construction of the wall of the lateral fluid opening of the coupling section and in the combination therewith of a novel type of gasket and in the resulting manner in which opposing coupling sections coact to maintain a tight joint.

As illustrated in Figs. 1 and 2, the coupling section is provided with an annular recess 13 encircling the lateral fluid opening in the face 5 of the pipe coupling section; an annular flange 15 positioned within the fluid opening and forming a part of the wall thereof; an inwardly-tapering annular recess 14, and an annular flange 16. The elements named give the wall of the fluid opening its contour. The annular flanges 15 and 16 are of slightly dissimilar size, as shown in Fig. 1. The breadth of the annular recess 14 is twice that of the annular recess 13.

The gasket, illustrated in Fig. 3, is a thick ring 8, of resilient material, having two outwardly-turned cylindrical flanges, 11 and 12, of equal size, so as to be reversible and allow the face 10 of either flange 11 or flange 12 to be used as the surface of the gasket abutting with the gasket of the opposing coupling section to make the joint. All adjoining surfaces of the gasket are at right angles, making all corners square.

The inner annular recess 14 of the pipe coupling section, as shown in Figs. 1 and 2, tapers to a slight extent, increasing in width from its bottom toward the opening. The corresponding flange of the gasket can therefore be wedged firmly in the recess.

The outer annular recess 13 in the pipe coupling section, illustrated in Figs. 1 and 2, opens square both to the face of the coupling section and to the fluid opening 4. The corresponding flange of the gasket, as illustrated in Fig. 1, fits tightly within this recess and projects slightly beyond the face 5 of the coupling.

For the purpose of increasing the resiliency of the coupling and to permit the gasket to be inserted easily in the coupling section, the protuberance of the flange 15 upon which the gasket is seated, is made slightly less than the depth of the groove 9 of the gasket, into which the flange protrudes.

Either flange of the gasket may be forced or sprung into the annular recess 14, the other flange fitting snugly in annular recess 13 and pressing against annular flange 15 of the coupling section, with the abutting face 10 of the gasket projected slightly beyond the face 5 of the coupling section.

In operation the radial pressure of the fluid upon the gasket tends to compress it against the coupling section wall and cause a slight lateral expansion of the gasket toward the joint to make it more secure. When sections are coupled pressure is exerted upon the face 10 of opposing gaskets. The surface of resistance presented by a coupling section to the gasket seated therein—what I term the back stop—when the joint is made, is in the annular recess 13 of the coupling section against which the gasket flange is pressed.

In the practice of my invention two counterpart coupling sections with gaskets, as illustrated in Fig. 1, are united by the usual rotary movement, with the fluid openings coinciding, by the engagement of opposing curved flanges 6 and grooved projections 7. A broad area of abutment is presented by the faces 10 of the externally-protruding gasket flanges, and loosening of the joint is effectually prevented by the compression of the abutting gasket flanges in vise-like manner between flanges 15 of opposing coupling sections.

I claim:

A pipe coupling consisting of counterpart detachable coupling sections having annular recessed coupling faces and lateral fluid openings therein having annular recessed walls, in combination with flexible gaskets having duplicate outwardly-turned flanges seated in the aforesaid recesses, the recess in the face of each coupling section being of less depth radially than the gasket flanges and providing a small intervening annular channel between the body of the gasket and the wall of the coupling section over which it is seated, whereby the gaskets of opposing coupling sections are pressed toward the joint by the expanding air pressure within, to maintain a non-leakable joint.

In testimony whereof I affix my signature in presence of two witnesses.

HERMAN R. EWERT.

Witnesses:
J. D. THOMAS,
E. F. LOUGHNEY.